Aug. 29, 1939.  C. F. CARROLL  2,170,793
CUTTING TORCH OR BLOWPIPE
Filed April 23, 1936  2 Sheets-Sheet 1
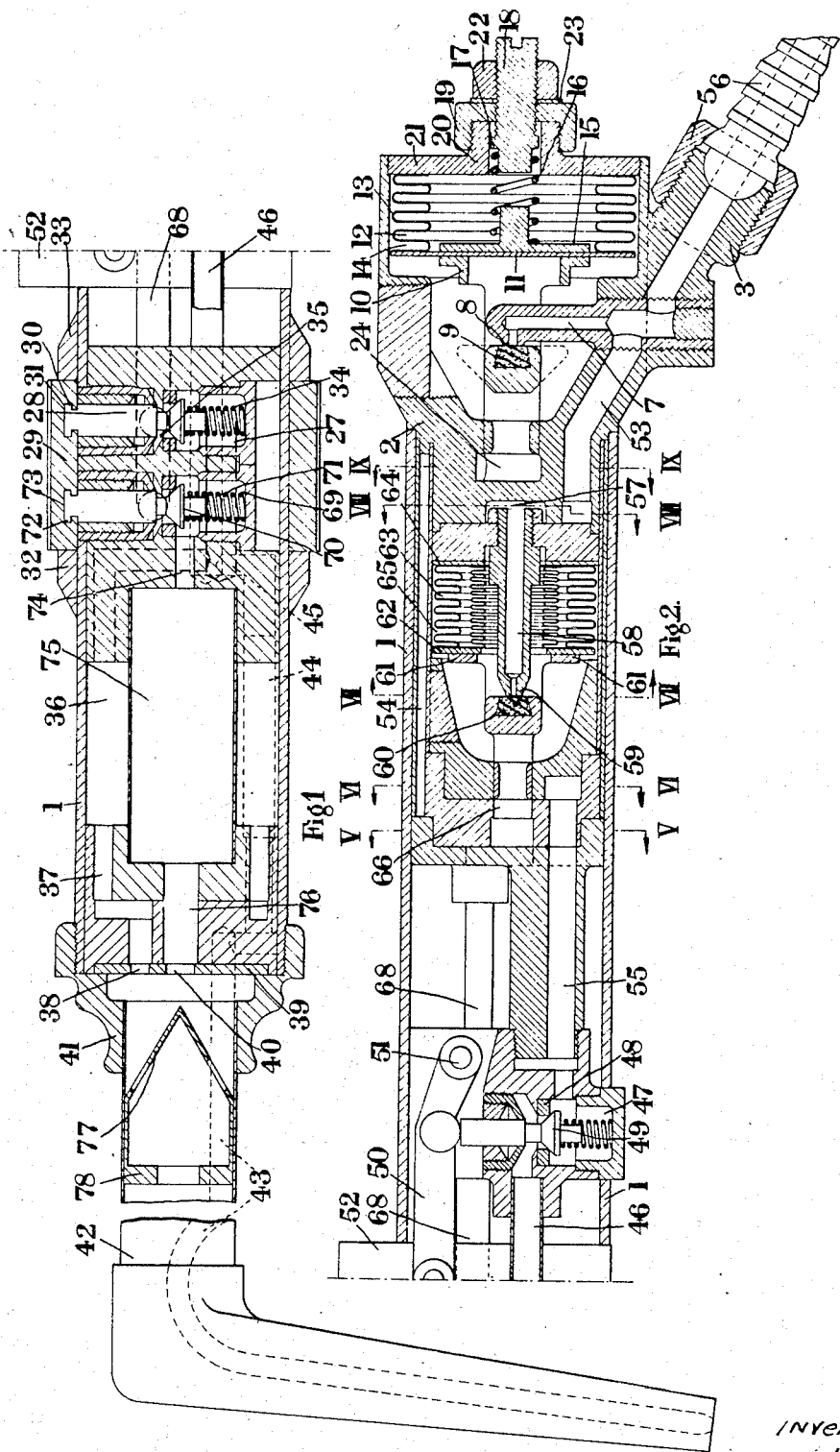

Aug. 29, 1939.   C. F. CARROLL   2,170,793
CUTTING TORCH OR BLOWPIPE
Filed April 23, 1936   2 Sheets-Sheet 2

C. F. Carroll
INVENTOR

By Glascock Downing & Seebold
Attys.

Patented Aug. 29, 1939

2,170,793

UNITED STATES PATENT OFFICE 2,170,793

CUTTING TORCH OR BLOWPIPE

Charles Francis Carroll, London, England

Application April 23, 1936, Serial No. 76,060
In Great Britain April 24, 1935

9 Claims. (Cl. 158—27.4)

This invention relates to a cutting torch or blowpipe adapted to be used either for cutting metal or in the welding of metal or for analogous purposes. A cutting torch or blowpipe of the type to which the present invention relates is connected to a source of suitable inflammable gas under pressure and also to a source of oxygen under pressure, the gas and oxygen becoming suitably intermixed in the torch to give the required and correct combustible mixture. When a torch of this kind is used for the cutting of metal the metal is first preheated by means of the flame produced at the nozzle of the torch by the ignited combustible mixture of gas and oxygen, and after the metal has been sufficiently heated a jet of the oxygen alone is directed against the metal and acts to destroy the carbon in the metal and to effect a severing thereof. When the torch is used in the welding of metal it is only necessary to employ the flame of the ignited combustible mixture of oxygen and gas. The manner in which a cutting torch or blowpipe of this character is employed for either cutting metal or welding metal is well understood in the art and need not be explained in greater detail, except to refer to the fact that heretofore torches of this character have been provided with separate manually manipulated valves controlling the rate of flow of gas and oxygen to the nozzle.

It has been necessary for the operators of torches of this kind to be extremely skilled, inasmuch as they must determine by a visual inspection of the flame if the proper combustible mixture is being employed and they must constantly adjust the manually manipulated control valves to compensate for degrees or changes in the pressure of the supply sources for the gas and oxygen.

An object of the present invention is to provide an improved cutting torch or blowpipe which is so constructed that the proper combustible mixture of gas and oxygen will always be obtained at the nozzle without the necessity of constant manipulation of control valves and the like, wherefore a relatively unskilled operator can efficiently operate the torch.

A further object is to provide a cutting torch or blowpipe wherein a constant predetermined flow pressure of gas and oxygen is delivered to the nozzle irrespective of changes or degrees in the pressures in the supply lines due to the consumption of the gas and oxygen or to other causes.

A further object is to provide a cutting torch or blowpipe wherein the rate of flow of the gases can be controlled by the operator through a single control member to adjust the size of the flame to suit the requirements of different types of work.

A still further object is to provide a cutting torch or blowpipe which is of improved construction, efficient in operation and can be easily controlled and manipulated.

Further and additional objects and advantages not hereinbefore specified will become apparent hereinafter during the detailed description which follows of an embodiment of the invention.

The invention consists in a cutting torch or blowpipe comprising a portion that can be grasped by the hand of an operator to manipulate the torch, a burner and cutting nozzle connected to said portion, separate passages within the said portion through which the combustible gas and the cutting gas or oxygen are delivered to said nozzle for intermixing to produce the heating flame, reducing valves within the said passages adapted to maintain substantially constant the pressures at which the gases are supplied to the nozzle irrespective of pressure changes in the supply lines, means associated with the said passages and located intermediate the reducing valves and the nozzle whereby the rate of flow of the gases supplied to the nozzle may be controlled, and a separate valve controlled passage for conducting cutting gas alone to the nozzle and located in said portion of the torch or blowpipe.

The invention will be described further in detail and by way of example with reference to the accompanying drawings, in which—

Figure 1 is a view in elevation partly in section of the forward part of the torch and, Figure 2 is a view in section of the rearward part of the torch, Figure 3 being a corresponding sectional plan view of the latter portion thereof.

Figure 3:
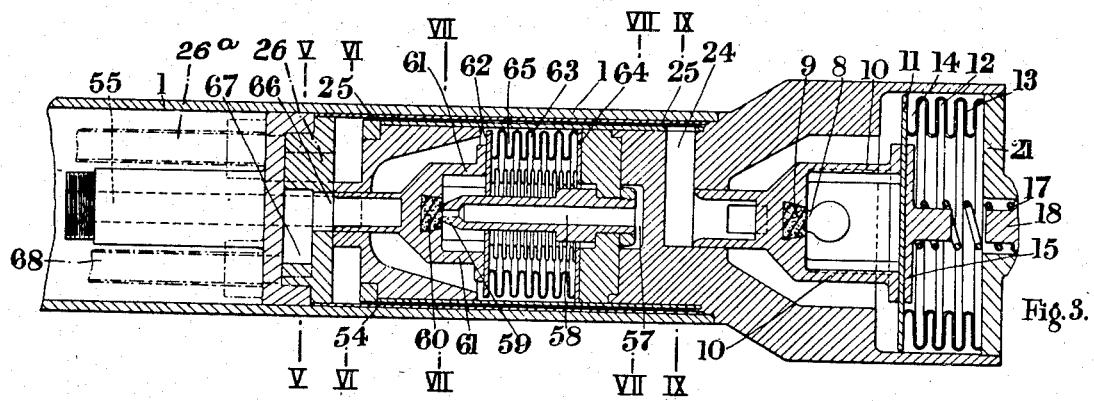

Figures 5, 6, 7, 8 and 9, being views in cross-section on planes on the lines V—V, VI—VI, VII—VII, VIII—VIII and IX—IX of Fig. 2 and are taken respectively looking in the direction of the arrows.

In the construction illustrated in the drawings, 1 is an outer tubular member which for ease of assembling the parts hereafter referred to is formed by joining longitudinally two half sections of tubing connected with the end piece 2 from which extend two tubulures 3 and 4 through the passages in which oxygen and a combustible gas under appropriate pressures are supplied, these tubulures being furnished with gland nuts one of which 5, is shown in Figure 2 operating to connect with the tubulures nipples such as 6, in turn connected with pipes leading from containers for oxygen and the combustible gas under high pressure.

The passage for oxygen under high pressure opens into a branch passage 7 in which is furnished a nozzle 8 upon which seats a movable valve element 9 forming part of a governor adapted to secure the delivery of oxygen at a relatively low and constant pressure. This movable valve element is furnished with limbs 10 whereby it is connected to the plate 11 bearing upon one end of an aneroid chamber 12 having corrugated walls 13 of an appropriate degree of flexibility and contained within the chamber 14 against one end of which the other end of the aneroid chamber abuts.

On the rear face of the plate is provided a member 15 furnishing a seating for one end of a helical spring 16 the other end of which seats upon the shoulder 17 of the screw-threaded member 18 engaging in an internal screw thread on the gland nut 19 in turn in screw-threaded engagement with the projection 20 on the member 21 forming the base of the chamber and on the screw-threaded member in question there is provided also a locking nut 22 and a washer 23 the purpose of the screw-threaded member being to adjust the degree of compression of the spring for adjusting the degree of pressure of the low pressure supply of oxygen.

The pressure of oxygen in the chamber 14 operates on the walls of the aneroid chamber to vary the rate at which the high pressure oxygen issues from the nozzle in a manner known in connection with gas governors, and the low pressure oxygen passes by way of the passage 24 into the passage 25 and thence by way of the passages 26, 26a to the chamber 27 (see Fig. 1) in which there is arranged a movable valve element 28 the degree of opening of which is adapted to be adjusted by the rotation of the ring 29 the valve in question being furnished with a head 30 engaging in cam shaped grooves 31 in the ring which is positioned between two abutment elements 32 and 33.

With the movable valve element is associated a spring 34 adapted to take up backlash.

The low pressure oxygen passing this valve travels by way of the passage 35 to the expansion chamber 36 functioning to prevent a "blow back" from which in turn it passes by way of a passage 37 and through the orifice 38 in the diaphragm 39 which is provided with a second orifice 40 for the issue of the combustible gas the supply of which is secured and regulated in the manner subsequently to be described.

In the construction illustrated the diaphragm is detachably secured in position by the member 41.

The orifices in this diaphragm are calibrated to allow a definite rate of flow of gas at a given pressure which pressure is maintained constant by the governor for the oxygen and a further governor which controls the pressure of the combustible gas and the material of the diaphragm in the immediate vicinity of the orifices may be thinned down to a "knife" edge if desired, although not shown as such in the drawings.

At this point it may be mentioned that the construction of the device illustrated may be modified to permit of the employment generally at the position indicated of a diaphragm furnished with a plurality of apertures so that the amount or rate of delivery of the mixture of low pressure oxygen and combustible gas may be adjusted or varied.

The mixture of low pressure combustion gas and low pressure oxygen issuing through these orifices passes to the burner nozzle 42 within which there is arranged a pipe 43 for the delivery, when desired, at the nozzle of high pressure oxygen for cutting purposes. This pipe is connected with the passages 44, 45 and 46 with the valve chamber 47 in which is furnished a seating 48 with which cooperates a movable valve element 49 whose position is adapted to be adjusted by movement of the lever 50 about its fulcrum 51 under pressure applied to the push button 52 connected with the free end of the lever, the valve when opened permitting the travel of high pressure oxygen from the source of supply thereof by way of the passages 53, 54 and 55 (see Figures 2, 6, 8, and 9), through the valve chamber and thence to the nozzle.

Figure 4:
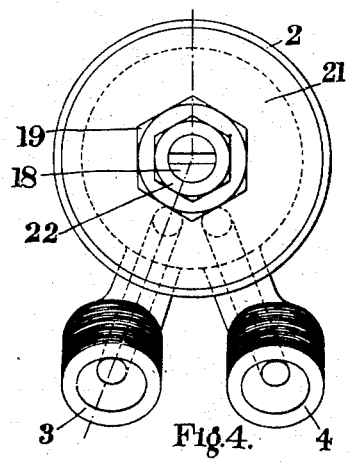
Figure 4 is a view in end elevation taken from the inlet end of the torch or blowpipe.
Figure 5:
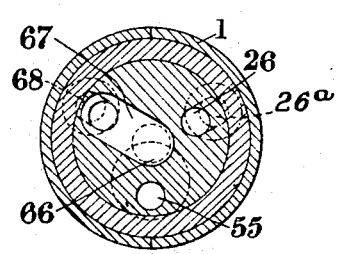
Figure 6:
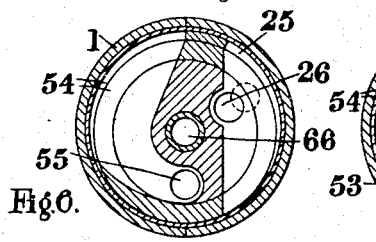
Figure 8:
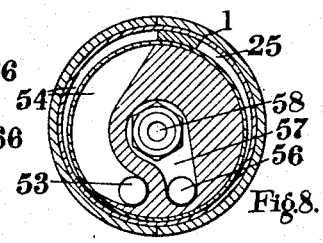
Figure 7:
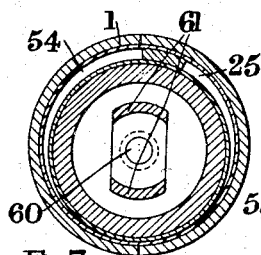
Figure 9:
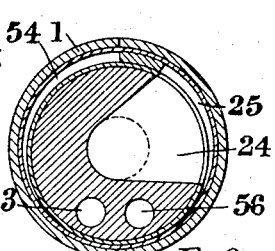

The combustible gas is supplied to the torch by way of the passage in the tubulure 4 (see Figure 4) by way of the passages 56, 57, and 58, the last-mentioned of which is furnished with a nozzle 59 with which cooperates a reducing valve generally resembling in construction the valve previously described, that is to say, it comprises a movable valve element 60 furnished on each of its two opposite sides with a limb 61 connected with a plate 62 seating upon the aneroid chamber 63, the opposite end of which seats upon the fixed abutment 64. The pressure of the gas within the chamber 65 in which the aneroid chamber is located acting upon the flexible walls of the latter, will operate to permit the valve to open only when the pressure within the chamber 65 falls below a predetermined limit. Thus, the pressure of gas supplied from the chamber through the passages 66, 67 and 68 to the valve chamber 69, in which is arranged a movable valve element 70 with which is associated a spring 71 adapted to take up backlash, is maintained constant. This movable valve element is furnished with a head 72 engaged in a cam shaped slot 73 in the ring 29 and by the rotation of the ring the degree of opening of this valve and also of the valve comprising the movable valve element 28 will be simultaneously effected.

On the opening of the valve, low pressure gas passes from the conduit 68 to the passage 74 and thence into the chamber 75 and by way of a passage 76 through the orifice 40 and thence to the jet 42 in which are located baffle members 77, 78.

In the construction above described in detail the pressure sensitive elements of the reducing valve or reducing valves are in the form of what may be referred to as an aneroid chamber. Instead of such devices, however, the equivalents thereof, for instance, flexible diaphragms, spring loaded elements or the like, may be employed.

Further, in certain constructions in accordance with the invention to improve the balance of the torch the chambers in which the reducing valves are located may be so arranged that their axes extend at right angles from the axis of the torch handle, and in some other portion thereof than the portion which is engaged by the hand.

Having now described my invention, what I claim as new and desire to secure by Letters Patent is—

1. In a cutting torch or blowpipe, a portion adapted to be gripped by the hand of the operator, a burner nozzle connected with said portion, separate passages within said portion through which a combustible gas and oxygen are delivered to said nozzle for intermixing to produce the heating flame, automatic pressure control valves arranged in said passages and adapted to maintain the pressure at which said gas and said oxygen are supplied to the nozzle substantially constant, and means associated with the said passages intermediate said pressure regulating valves and said nozzle for controlling the rate of flow of the gas and oxygen supplied to the nozzle.

2. In a cutting torch or blowpipe, a portion adapted to be gripped by the hand of the operator, a burner nozzle connected with said portion, separate passages within said portion through which a combustible gas and oxygen are delivered to said nozzle for intermixing to produce the heating flame, automatic pressure control valves arranged within said passages for maintaining the pressure at which the gas and oxygen are delivered to the nozzle substantially constant, flow regulating valves associated with said passages intermediate said pressure regulating valves and said nozzle, and a single manually operated regulating member operatively associated with said flow regulating valves whereby the rate of flow of said gas and oxygen to the nozzle may be simultaneously controlled.

3. In a cutting torch or blowpipe, a portion adapted to be gripped by the hand of the operator, a burner nozzle connected with said portion, separate passages within said portion through which a combustible gas and oxygen are delivered to said nozzle for intermixing to produce the heating flame, automatic pressure regulating valves arranged within said passages to maintain the pressures at which the gas and oxygen are supplied to the nozzle substantially constant, flow regulating valve means associated with said passages intermediate said pressure regulating valves and said nozzle for controlling the rate of flow of said gas and oxygen to the nozzle, and a diaphragm associated with said passages intermediate said flow regulating valves and said nozzle and having calibrated orifices therein for proportioning the flow of gas and oxygen to the nozzle.

4. In a cutting torch or blowpipe, a portion adapted to be gripped by the operator, a burner nozzle connected with said portion, separate passages within said portion through which a combustible gas and oxygen are delivered to said nozzle for intermixing to produce the heating flame, automatic pressure control valves arranged in said passages for maintaining the pressures at which the gas and oxygen are delivered to the nozzle substantially constant, flow regulating valves associated with said passages intermediate said pressure control valves and said nozzle, a single manually controlled regulating member operatively associated with said flow regulating valves whereby the rate of flow at which the gas and oxygen are delivered to the nozzle may be simultaneously controlled, and a diaphragm associated with said passages intermediate said flow regulating valves and said nozzle and having calibrated orifices therein for proportioning the flow of gas and oxygen delivered to the nozzle.

5. In a cutting torch or blowpipe, a portion adapted to be gripped by the hand of the operator, a burner and cutting nozzle connected with said portion, separate passages within said portion through which a combustible gas and oxygen are delivered to said nozzle for intermixing to produce the heating flame, automatic pressure control valves arranged within said passages for maintaining the pressures at which the gas and oxygen are supplied to the nozzle substantially constant, flow regulating valves associated with said passages intermediate said pressure control valves and said nozzle for controlling the rate of flow of the gas and oxygen supplied to the nozzle, a third passage in said portion for conducting cutting oxygen to said nozzle independently of the hereinbefore named passages, and a manually controlled valve for controlling the flow of oxygen through said third passage.

6. In a cutting torch or blowpipe, a portion adapted to be gripped by the hand of the operator, a burner and cutting nozzle connected with said portion, separate passages within said portion through which a combustible gas and oxygen are delivered to said nozzle for intermixing to produce the heating flame, automatic pressure control valves arranged in said passages for maintaining the pressure at which the gas and oxygen are supplied to the nozzle substantially constant, flow regulating valves arranged in said passages intermediate said pressure control valves and said nozzle, a single manually operated regulating member operatively associated with the flow control valves whereby the rates of flow at which the gas and oxygen are delivered to the nozzle may be controlled, a third passage in said portion for independently conducting cutting oxygen to said nozzle, and a manually actuated control valve for controlling the flow of oxygen through said third passage.

7. In a cutting torch or blowpipe, a portion adapted to be gripped by the hand of the operator, a burner nozzle connected with said portion, separate passages within said portion through which a combustible gas and oxygen are delivered to said nozzle for intermixing to produce the heating flame, automatic pressure control valves arranged in said passages and adapted to maintain the pressures at which said gas and said oxygen are supplied to the nozzle substantially constant, and means associated with the said passages for controlling the rate of flow of the gas and oxygen to the nozzle.

8. In a cutting torch or blowpipe, a portion adapted to be gripped by the hand of the operator, a burner nozzle connected with said portion, separate passages within said portion through which a combustible gas and oxygen are delivered to said nozzle for intermixing to produce the heating flame, automatic pressure control valves arranged within said passages for maintaining the pressures at which the gas and oxygen are delivered to the nozzle substantially constant, flow regulating valves associated with said passages, and a single manually operated regulating member operatively associated with said flow regulating valves.

9. In a cutting torch or blowpipe, a portion adapted to be gripped by the hand of the operator, a burner and cutting nozzle connected with said portion, separate passages within said portion through which a combustible gas and oxygen are delivered to said nozzle for intermixing to produce the heating flame, automatic pressure control valves arranged within said passages for maintaining the pressures at which the gas and oxygen are supplied to the nozzle substantially constant, flow regulating valves associated with said passages, a third passage in said portion for conducting cutting oxygen to said nozzle independently of the hereinbefore named passages, and a manually controlled valve for controlling the flow of oxygen through said third passage.

CHARLES FRANCIS CARROLL.